Nov. 25, 1941.  N. M. MARSILIUS ET AL  2,263,928

MILLING MACHINE

Filed July 23, 1938  7 Sheets-Sheet 1

INVENTORS:
Newman M. Marsilius and
Robert Wm. Ott
BY Chapin & Neal
ATTORNEYS

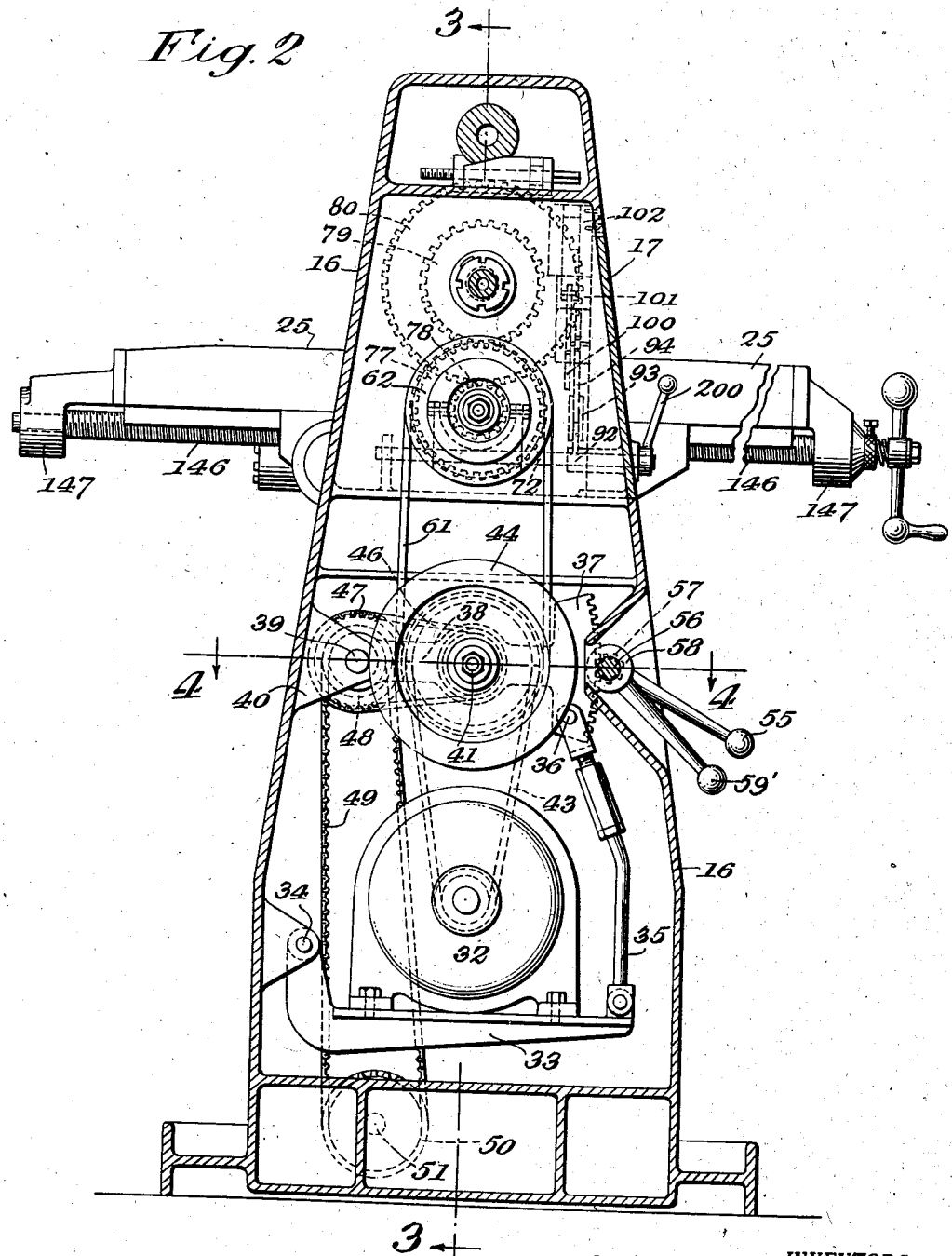

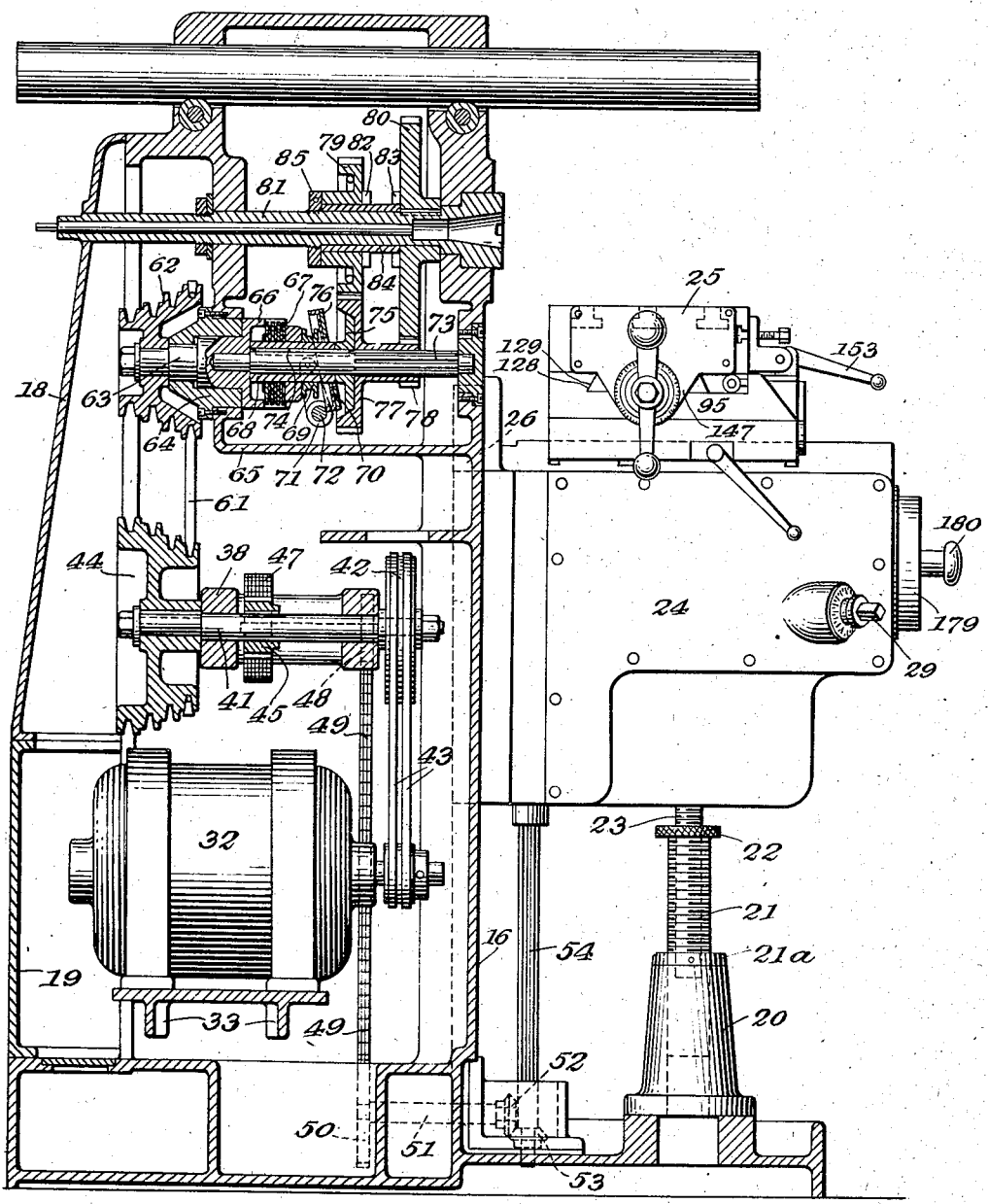

Nov. 25, 1941.   N. M. MARSILIUS ET AL   2,263,928
MILLING MACHINE
Filed July 23, 1938   7 Sheets-Sheet 4
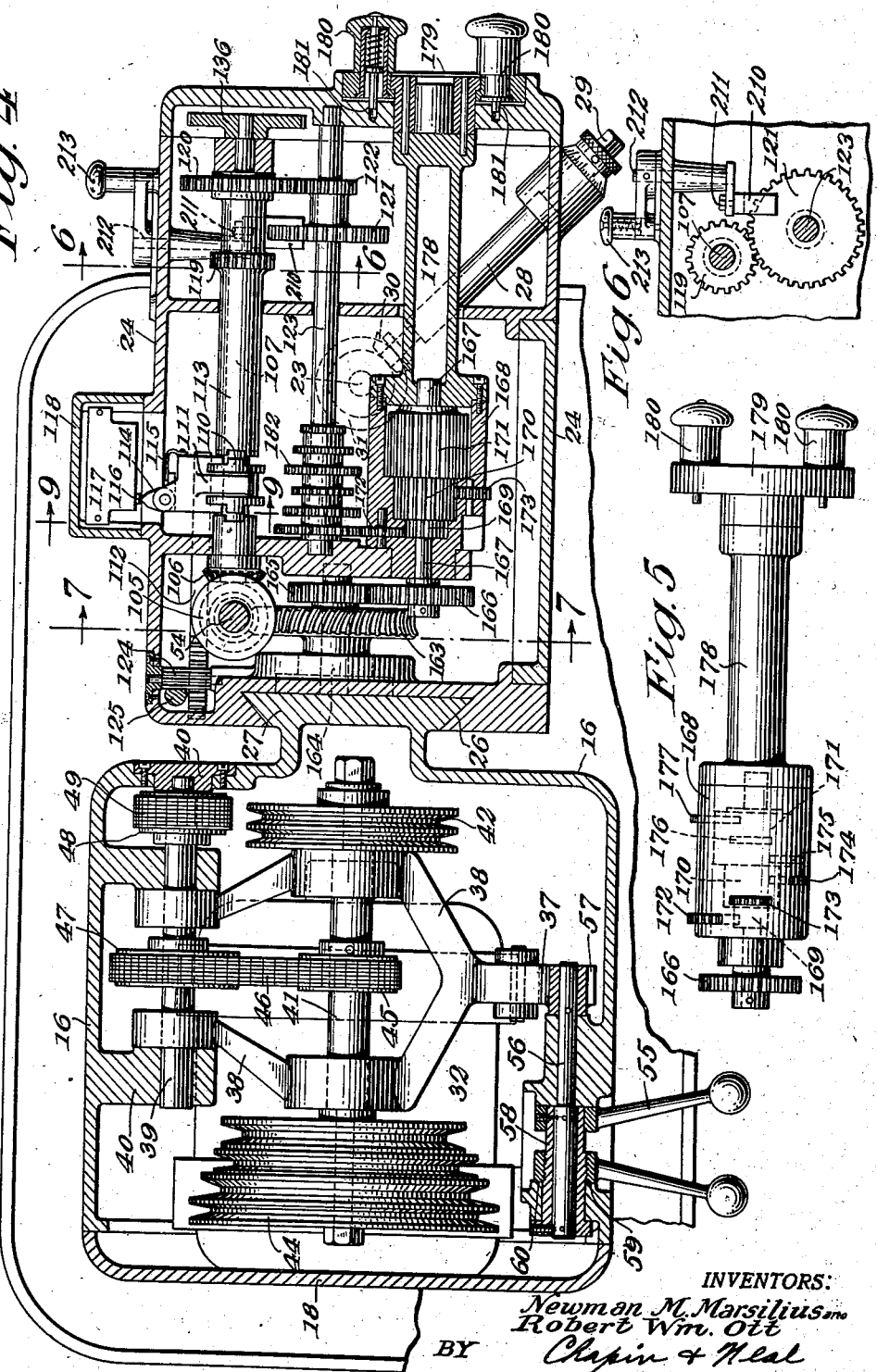
INVENTORS:
Newman M. Marsilius
Robert Wm. Ott
BY Chapin + Neal
ATTORNEYS Nov. 25, 1941.  N. M. MARSILIUS ET AL  2,263,928
MILLING MACHINE
Filed July 23, 1938  7 Sheets-Sheet 5
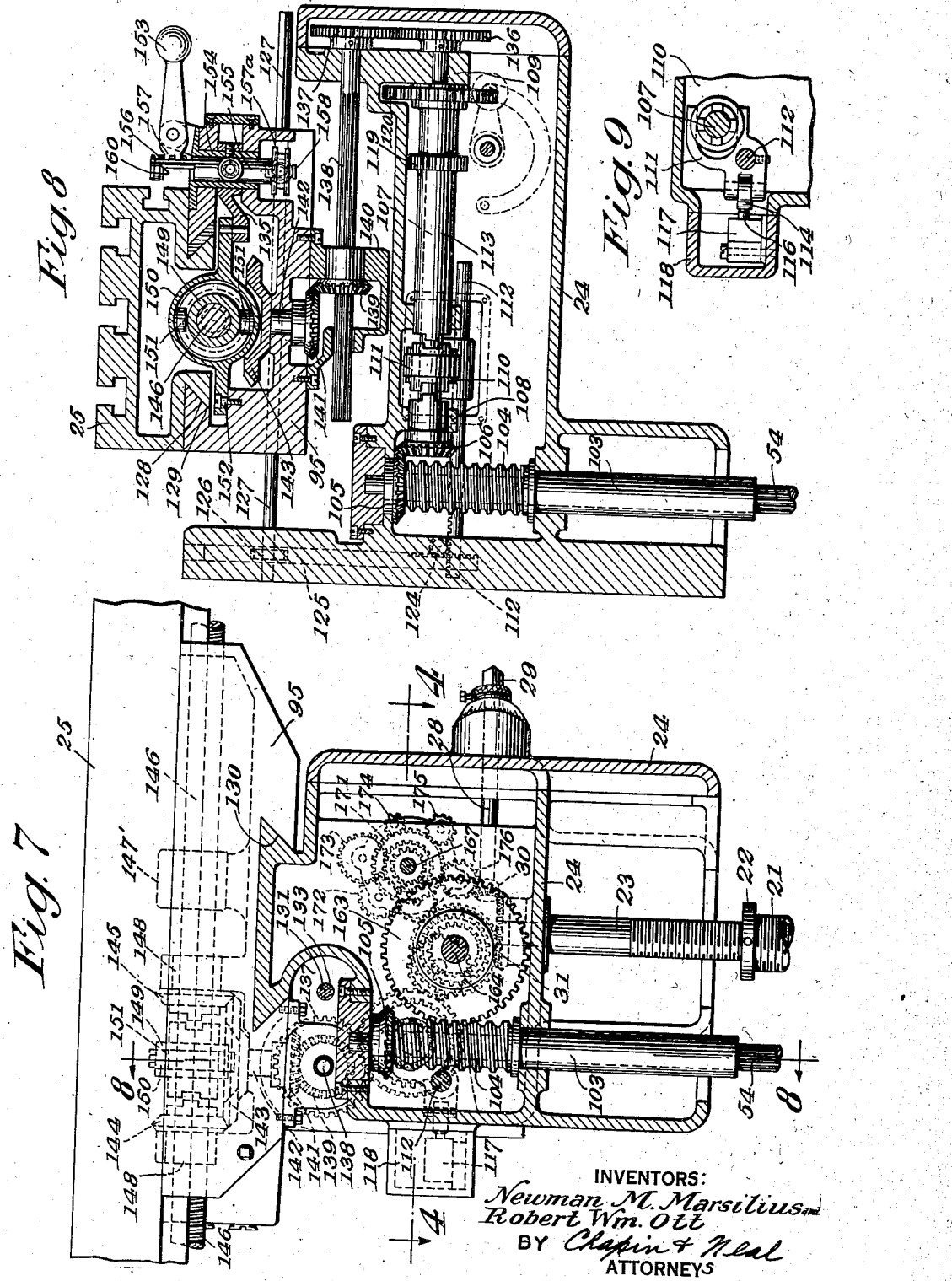
INVENTORS:
Newman M. Marsilius and
Robert Wm. Ott
BY Chapin & Neal
ATTORNEYS Nov. 25, 1941.　　N. M. MARSILIUS ET AL　　2,263,928
MILLING MACHINE
Filed July 23, 1938　　7 Sheets-Sheet 6
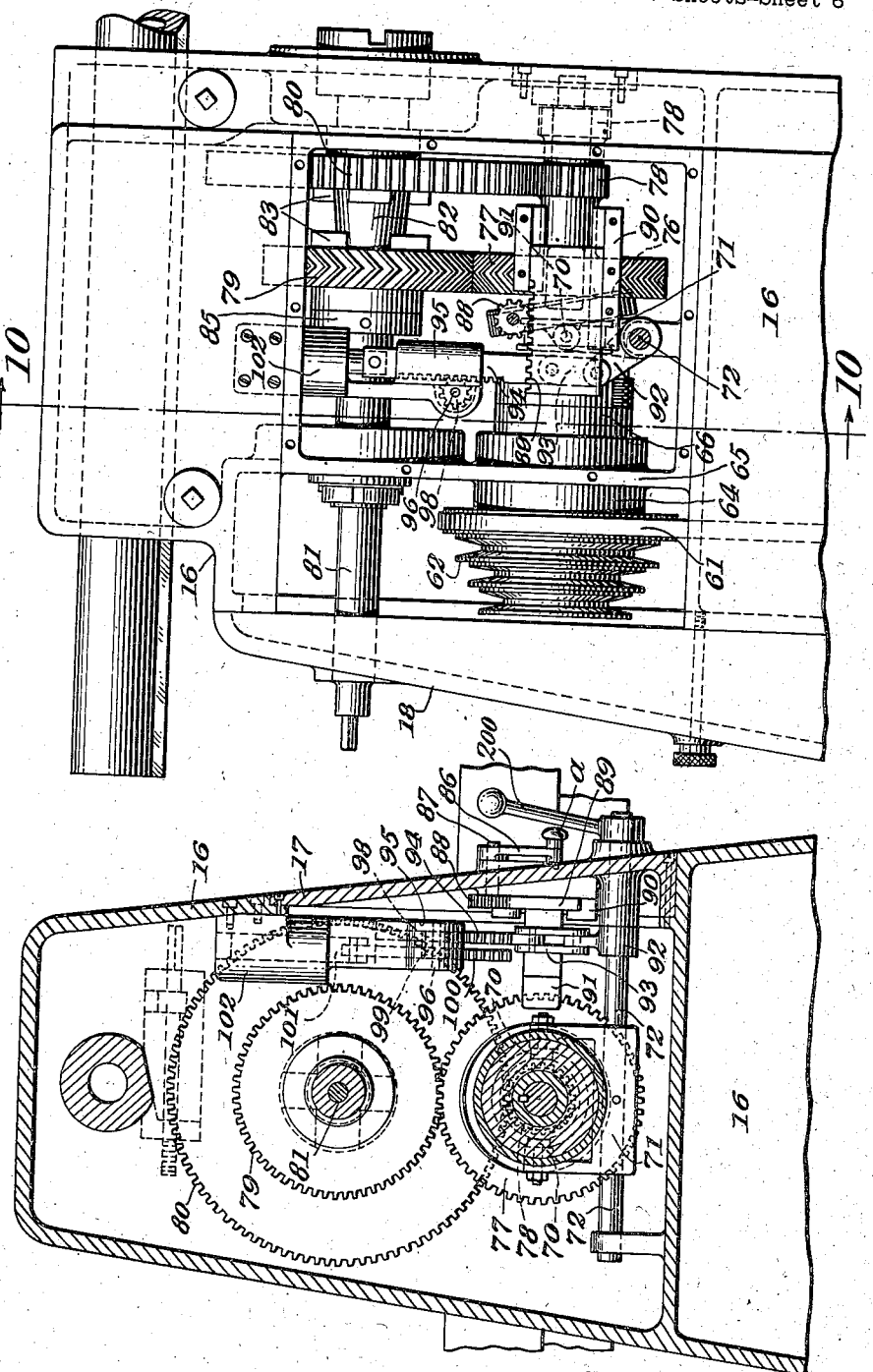
INVENTORS:
Newman M. Marsilius and
Robert Wm. Ott
BY Chapin + Neal
ATTORNEYS Nov. 25, 1941.   N. M. MARSILIUS ET AL   2,263,928
MILLING MACHINE
Filed July 23, 1938   7 Sheets-Sheet 7

INVENTORS:
Newman M. Marsilius and
Robert Wm. Ott
BY Chapin & Neal
ATTORNEYS

Patented Nov. 25, 1941

2,263,928

UNITED STATES PATENT OFFICE 2,263,928

MILLING MACHINE

Newman M. Marsilius, Bridgeport, and Robert W. Ott, Stratford, Conn., assignors to Van Norman Machine Tool Company, Springfield, Mass., a corporation of Massachusetts Application July 23, 1938, Serial No. 220,882

8 Claims. (Cl. 90—21)

Our invention relates to new and useful improvements in milling machines of the type employing an adjustable knee for carrying the work table and provided with a cutter spindle adapted to carry one or more cutters for operating upon work carried by the table. The machine is provided with a large number of table feed changes arrived at through a series of gears carried in a novel manner and which can be easily operated to change the gearing and the feed of the table.

An object of the invention is to provide spindle speeds applicable to proper cutting speeds, the latter being obtained primarily through cone pulleys and belting which transmits power from a motor to an arbor shaft carrying the cutters, and further through high and low speed gearing contained within the upper portion of the column, said gears preferably being manually operated, although provided with solenoid operating means for automatically stopping the spindle as for changing work, etc.

Other objects of the invention are to provide a milling machine with a sufficient range of spindle speeds at changes of feed ratios applicable to modern cutting alloys with the greatest simplicity, thereby increasing efficiency and reducing maintenance. The possibilities of the machine are extended as a result of a unique single table movement control. This control actuated manually or with a single line of trip dogs facilitates not only rapid traverse of the table in either direction, but also a change from rapid traverse to feeding rate movements while the table is traveling in a single direction. The above feed and return movements may be performed automatically or manually by means of a single hand lever capable of slightly varying operations to bring about the change of speeds of the table as well as stopping the travel of the table.

In the accompanying drawings:

Fig. 2 is a sectional elevation on a slightly reduced scale of the machine as seen from the opposite side of Fig. 1, the side of the column of the machine being removed better to illustrate the internal mechanism;

Fig. 3 shows a central vertical sectional view taken on line 3—3 of Fig. 2, the table and knee being in elevation;

Fig. 4 shows an enlarged sectional plan view taken on line 4—4 of Figs. 2 and 7;

Fig. 5 is a detached plan view of the gear carrying drum shown at the right in Fig. 4;

Fig. 6 is a detailed cross-sectional view taken on line 6—6 of Fig. 4 better to illustrate the gear shifting means;

Fig. 7 shows a vertical cross-section taken on line 7—7 of Fig. 4;

Fig. 8 is a vertical section on line 8—8 of Fig. 7;

Fig. 9 is a detailed cross-section taken on line 9—9 of Fig. 4 better to illustrate the clutch operating means;

Fig. 10 is an enlarged vertical section, see line 10—10 of Fig. 11, through the upper portion of the column better to illustrate the mechanism shown in the upper portion of Fig. 2;

Fig. 11 shows a side elevational view of the upper portion of the column with closure plate removed, illustrating the mechanism contained therein, as seen from the right of Fig. 10;

Figure 1:
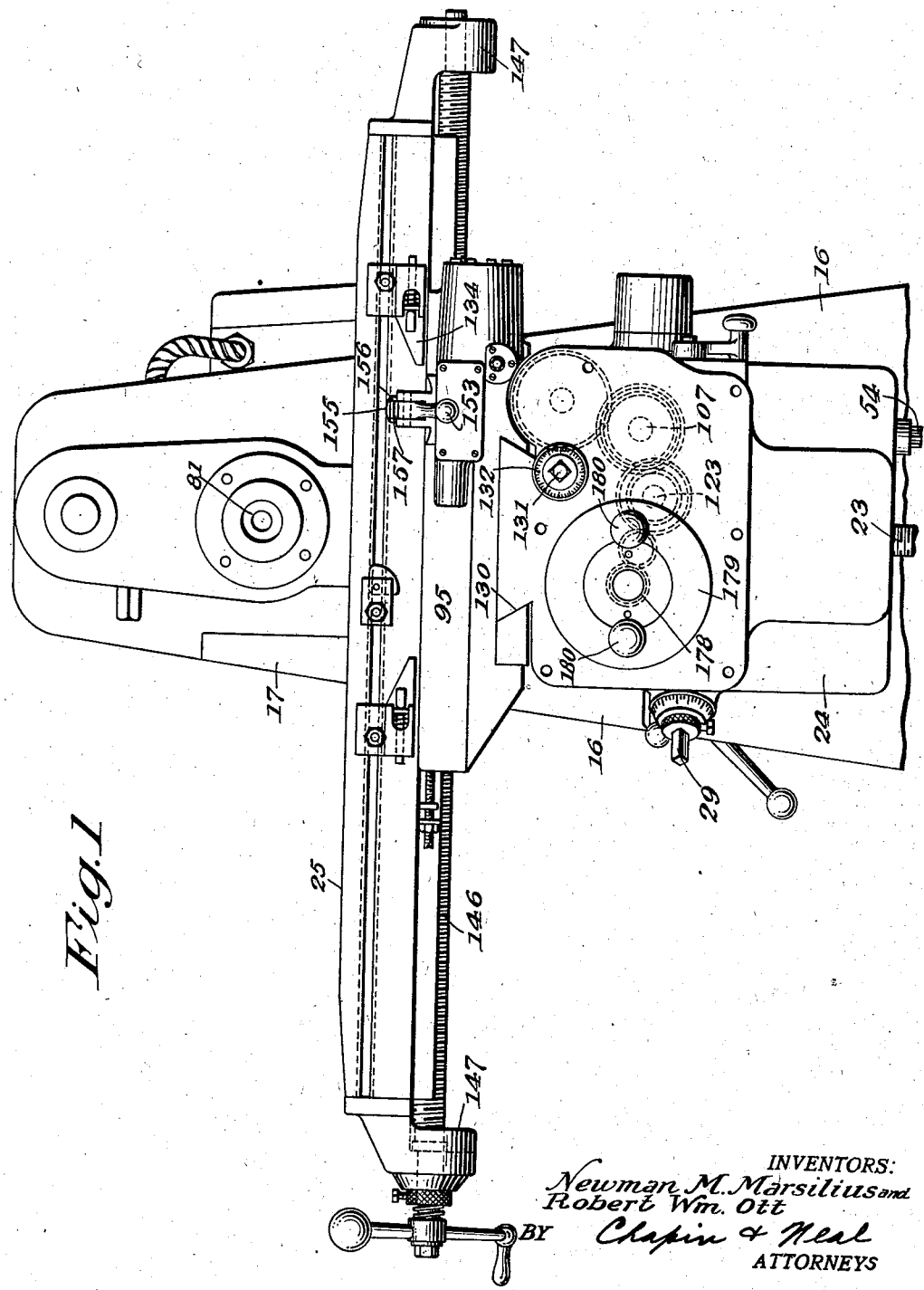
Fig. 1 shows a front elevation of the upper portion of our improved milling machine.

Referring now to the characters of reference marked upon the drawings, 16 represents a hollow frame or column upon which the several parts of our machine are mounted and having a removable closure plate 17 positioned on the side as seen in Figs. 2, 10, and 11, whereby access may be had to the mechanism contained within the upper portion of the column. The machine further includes other removable closure plates 18 and 19, see Fig. 3, whereby other parts within the column are made accessible. The base of the column extends forward to form a tubular support 20 in which a sleeve 21 is threaded in a nut 21a, the sleeve having a flange 22 on its upper end. This sleeve has threaded into it a screw 23 that is longitudinally fixed to and projects downward from the adjustably mounted knee 24 that carries the work table 25.

Referring to Fig. 4, it will be seen that this adjustable knee is provided with a vertical dovetailed way 26 that is fitted for vertical adjustment on a dovetailed runway 27 on the front side of the column so that with the turning of the screw 23 the knee and its table may be caused to slide up and down upon the dovetailed runway for positioning the table at desired heights with respect to the cutter arbor. This screw 23 is adapted to be turned to accomplish these adjustments through the medium of a shaft 28 journaled in the knee housing and having its squared end 29 exposed for engagement by a wrench or other tool for turning the same. The inner end of this shaft, see Figs. 4 and 7, is provided with a bevel pinion 30 which meshes with a larger bevel pinion 31 upon the threaded shaft 23.

The several mechanisms of the machine derive their power from an electric motor 32 (Figs. 2 and 3) mounted upon an adjustable motor bracket 33 positioned in the base of the column and hingedly connected as at 34 to one side of the column. The bracket is supported near the opposite side by an adjustable rod 35, the lower end of which is hingedly connected to the free end of the bracket 33 and whose upper end is similarly connected as at 36 to a segment 37 forming a part of an adjustable hanger 38 (Fig. 4) whose opposite end portion is hingedly supported on a shaft 39 journaled in bearings 40 of the column. A shaft 41 is journaled in the hanger 38 and as will be seen carries a motor driven pulley 42 upon its inner end that is connected by belts 43 to a pulley on the motor shaft and whereby the said shaft 41 is driven. On the other end of this shaft is mounted a cone-pulley 44 which serves to transmit power to the upper part of the machine, later to be referred to. An intermediate sprocket 45 is also mounted upon the shaft 41 and is connected by a silent chain 46 with a sprocket 47 on the beforementioned shaft 39. This latter shaft also carries a sprocket 48 that is connected by a chain belt 49 with a sprocket 50 in the base of the machine that is mounted on a short shaft 51, see Fig. 3, that carries a bevel pinion 52 which meshes with and drives a like pinion 53 on a vertical splined shaft 54 that extends up into the knee housing 24 and serves to convey power to the mechanisms therein contained for reciprocating the table through a multiple change speed gearing shown in Figs. 4 and 7 and later to be described.

This hanger 38, of which the beforementioned segment 37 forms a part (Figs. 2 and 4), is adapted to be raised and lowered to permit shifting and adjustment of the belt 61 on cone pulley 44 without disturbing the belt 43 or the chain 46 through the operation of a handle 55, see Figs. 2 and 4, which projects out from the side of the machine, is mounted upon a shaft 56 journaled in a bracket of the housing, and carries a small pinion 57 which meshes with the segment in a way to raise and lower the same and its hanger with the movement of the handle 55. A sleeve 58 is mounted on and secured to the shaft 56 and has a threaded peripheral surface upon which a nut 59 is mounted, the said nut having an outwardly extended handle 59' for its operation whereby it may be turned up against the bearing 60 in a way to lock the shaft and its pinion for the purpose of holding the segment and its hanger in a fixed position after being adjusted and at the same time mounting it in such a manner as to permit these adjustments to take place from time to time as occasion may require.

From the cone pulley 44 a belt connection 61 is provided with a similar but somewhat smaller cone pulley 62 that is mounted upon a rotatable clutch member 63 that is journaled in bearings 64 in the partition 65 of the upper part of the column. This clutch member includes an annular bearing and spider 66 that engages certain of the clutch plates 67 mounted upon a sleeve 68 which engages the remaining plates in the usual manner. On the opposite side of these plates from bearing 66 is a collar 69 having an annular groove therein to receive shoes 70 of an arm 71 secured on a rocker shaft 72. One end of a driven shaft 73 is journaled in the clutch member 63 and extends through the beforementioned sleeve 68 and has its other end journaled in the column. The inner end portion of this shaft is provided with a keyway 74 to secure the clutch sleeve 68 to the shaft 73. A brake member 75 is pinned to the shaft 73 and serves to be engaged by the brake shoe 76 when the rocker shaft 72 is operated to release the clutch and automatically apply the brake. The brake member 75 is normally positioned in a pocket in the side of the gear 77. This gear is provided with a sleeve which is mounted upon the splined portion of the shaft 73 and upon the end portion of this sleeve is formed a smaller gear 78 that is located in spaced relation to the larger beforementioned gear 77. The said gears 77 and 78 always run together. The gear 77 meshes with and drives a gear 79 which together with the gear 77 is provided with herringbone teeth which not only produce an efficient and quiet running gear drive but also insure the sliding of the two together so that in case one is slid upon its shaft the other gear is also moved with it. These gears together with the gear 78 serve as alternative drives for the clutch face gear 80 on an arbor shaft 81 which is positioned in the column above the beforementioned shaft 73.

In this connection it will be noted that the gear 80 is keyed to the shaft 81 and thus serves to drive the same either slowly through the smaller gear 78 on the lower shaft or more rapidly through the engagement of the clutch teeth 82 on the gear 79 with the clutch teeth 83 on the face of the gear 80. The slidable clutch faced gear 79 is mounted upon a sleeve 84 carried on the shaft 81 and is held against longitudinal movement in one direction by the nut 85 threadably engaging the shaft 81 which forms a positioning stop for the gear 79 when in the position shown in Fig. 3. This gear 79 as before stated is a herringbone gear and is thus adapted to be carried along on the sleeve 84 with the longitudinal movement of the dual gears 77 and 78 splined on the clutch shaft 73.

Figure 12:
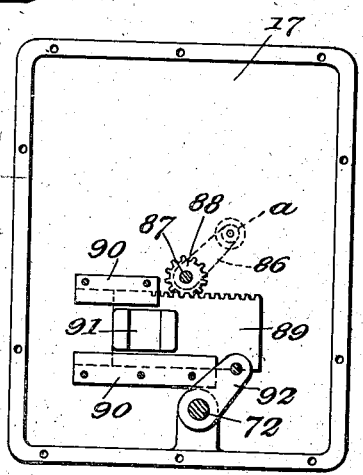
Fig. 12 is a detached inside view of the closure plate 17 and attached gear shifting means, see Figs. 10, 11, and 12.

A manually operable gear shift for moving these dual gears upon their shaft is shown in Figs. 10, 11, and 12, and serves to move them to the right from the position shown in Fig. 3 which obviously tends to disengage the smaller gear 78, see dotted line Fig. 11, from the larger gear 80 and also move the other two gears 77 and 79 horizontally in a way to engage the clutch faces of the gears 79 and 80. This manually shifting device comprises a hand lever 86 that is mounted upon a short shaft 87 supported on the closure plate 17 beforementioned and carries a small pinion 88 on its inner end. This pinion engages a rack 89 that is mounted to slide horizontally in ways 90 which, as will be seen from Figs. 10, 11, and 12, are secured to the inner face of the beforementioned closure plate 17. This slidable rack carries a yoke 91 that straddles the peripheral surface of the lower gear 77 in a way to move it to the right and left by the operation of the handle 86 and its shaft 87. This handle is provided with a detent a for engagement with pockets in the plate to retain the parts in their adjusted positions.

The rocker shaft 72 is operated by the handle 200 shown on the side of the machine in Fig. 10 or it may be electrically operated by means of the following gearing. An arm 92 that is also mounted on the rocker shaft 72 is connected by links 93 with a rack 94 which is slidably mounted in a housing 95 secured to the inner faces of the column 16 shown in Fig. 10. A short shaft 96 that is journaled in the housing 95 carries two small pinions 98 and 99 of different diameters, the former of which is engaged by the said rack 94 and the latter with a somewhat similar rack 100 that is also slidably mounted in the beforementioned housing and has its upper end connected to an armature 101 of an electrical solenoid 102. From this it will be seen that with the operation of the solenoid, the pinions 98 and 99 together with their shaft will be operated in a way to move the racks in the same direction though at different speeds and thereby operate the arm 92 on the rocker shaft 72 in a way to disengage the clutch 67 to stop the clutch shaft 73 and the spindle 81 and to also operate the brake 76 as is necessary to insure a quick stoppage of the spindle driving gears. When the solenoid is once actuated to release the clutch the latter remains in released position until it is again manually engaged by the handle 200.

Referring next to the work table feed mechanism (Figs. 4, 7, 8, and 9) contained within and upon the knee 24, it will be seen that the driven shaft 54 extends up into the knee through a sleeve 103 positioned in the knee and carries a worm 104 and a bevel gear 105, the latter meshing with a bevel pinion 106 free on a horizontal shaft 107 journaled in bearings 108 and 109. The bevel pinion 106 has a clutch face which is engaged by a movable clutch member 110 keyed to slide on and rotate with the said horizontal shaft. The clutch member is operated through a yoke 111 secured to a slidable rack 112, see Figs. 4, 8, and 9, whereby said clutch may be shifted to the right or left from the neutral position shown in Figs. 4 and 8 to engage either the clutch face of the bevel pinion 106 or the clutch faced sleeve 113. This slidable yoke 111 has pivoted to it a finger 114 having a right angled portion normally retained in engagement with the face of yoke 111 by means of a spring 115. If the clutch is moved towards gear 106 the point of the finger depresses a button 116 of a switch 117 contained within the switch box 118. The switch is suitably connected to operate spindle stop solenoid 102, thereby stopping the rotation of the spindle when the clutch is shifted towards gear 106 to cause rapid traversing of the table to its starting position for reloading the work on the table. In the reverse movement of the clutch the finger 114 yields and does not depress the button 116.

The sleeve 113 enclosing the horizontal shaft 107 carries two gears 119 and 120 that mesh with and are driven by the associated sliding gears 121 and 122 on a cone gear shaft 123, through which change gearing later to be described is operated. These sliding gears act as a supplementary change gear to increase the range of the latter change gearing.

The beforementioned rack 112, see Figs. 4 and 8, is suitably guided in the knee frame and engages an elongated gear 124 journaled in the frame. This gear, as will be seen in Figs. 4 and 8, also engages with a vertical rack 125 which is slidably mounted in the knee housing and engages a gear 126 on a cross rotatable shaft 127 that extends through the lower portion of the saddle 95 so as to provide automatic shifting and hand operating mechanism for the table traverse, as will be described.

The work table 25 is carried on the saddle 95 which is dovetailed as at 128 to receive a corresponding way 129 formed on the work table and is thereby adapted to be fed in either direction with work secured thereon to be milled by rotary cutters carried by the arbor shaft 81 beforementioned. The saddle is adjustable crosswise on the knee on ways 130 through the movement of an adjustable screw 131 carrying a graduated dial 132 and which is journaled crosswise in the knee and threadedly engages the saddle as at 133 (Fig. 7). The drive means for this table, see Figs. 7 and 8, is derived through the beforementioned shafts 54 and 107 which latter shaft, as will be seen, carries a gear 136 that meshes with and drives a similar gear 137 on a shaft 138 mounted above the shaft 107 and passing through a bevel pinion 139 whose hub portion is journaled in a bracket 140 secured to the under side of the saddle 95, said pinion being splined to receive the shaft 138 and to permit it to be moved therethrough with the adjustment of the saddle upon the knee. This bevel pinion 139 meshes with and drives a similar bevel pinion 141 that is carried on a short vertical shaft 142 journaled in the saddle and carrying a bevel gear 143. This latter gear, see Figs. 7 and 8, meshes with correspondingly beveled gears 144 and 145 mounted to turn freely around the feed screw 146 that is journaled in bearings 147 in opposite end portions of the work table 25 and is threaded into a nut 147' on the saddle 95. These gears 144 and 145 are provided with sleeves that are journaled in bearings 148 of the saddle 95 and are further provided with clutch faces that are adapted to be engaged by a double faced clutch member 149 splined on the feed screw and adapted to be moved thereon to engage the clutch faces of either of the said bevel gears 144 or 145 so as to drive the feed screw in a forward or backward direction and consequently move the table in either direction.

This slidable clutch member 149 is provided with a yoke 150 that encircles the clutch and carries rollers 151 for engagement with the grooves in the clutch for sliding the same upon the spline which runs substantially throughout the length of the feed screw. One end portion of the yoke is hingedly connected to the saddle 95 as at 152 while the other end is hingedly connected to an arm 135 that is secured to a vertical sleeve 154 mounted for rotary movement in the housing and forms a bearing for a post 155 positioned therein for vertical sliding movement. This post is provided with a rack 156 that is engaged by a segment 157 of a hand lever 153 carried by the sleeve 154 and through which the clutch 149 is operated to stop the movement of the table, to shift its direction of movement and to put the table into feed or rapid traverse. This operating lever serves not alone to move the yoke 150 by rotating the sleeve 154 but is also connected through the rack and segment to permit the post to be raised and lowered, whereby its connection with the beforementioned shaft 127 will serve to rock the latter and through its line of connections to shift the main clutch on shaft 107 through which the power feed for the table is transmitted.

Figure 13:
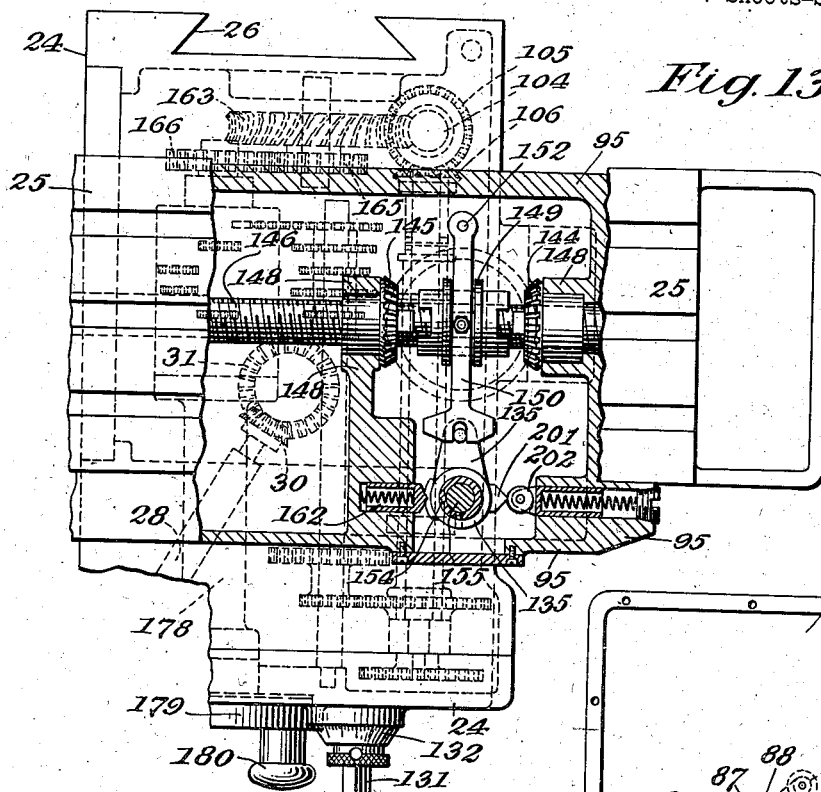
Fig. 13 is a top plan view of the right-hand end portion of the work table shown in Fig. 1, the table being broken away to show the automatic reversing mechanism within the table.
Figure 15:
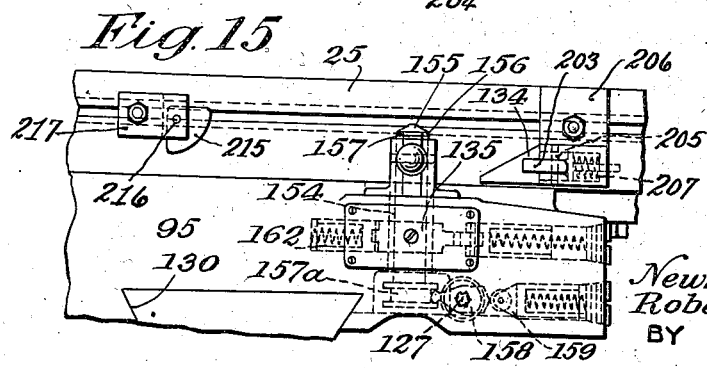
Fig. 15 shows an enlarged front view of the table, dogs, and reversing mechanism shown in Figs. 1, 13, and 14.

The post 155 is moved up and down within its sleeve 154 to rock the shaft 127, and upon its lower end is provided a disk 157a in which is formed an annular groove to receive the end of a short rockable arm 158, see Fig. 15, that is secured to the beforementioned shaft 127. The opposite edge portion of this rocker arm is engaged by a spring actuated frictional detent 159 which serves to hold the shaft in either extreme position, that is, with the clutch 110 in engagement either with the gear 106 or with the sleeve 113. The rocker arm 135 secured on the sleeve 154 is also provided with a detent 162, see Figs. 13 and 15, which likewise serves to hold the arm and its sleeve in neutral position; and with a wedge-shaped detent 201 bearing against a spring pressed roller 202 to force the rocker to either extreme position when it is once displaced from neutral.

Figure 14:
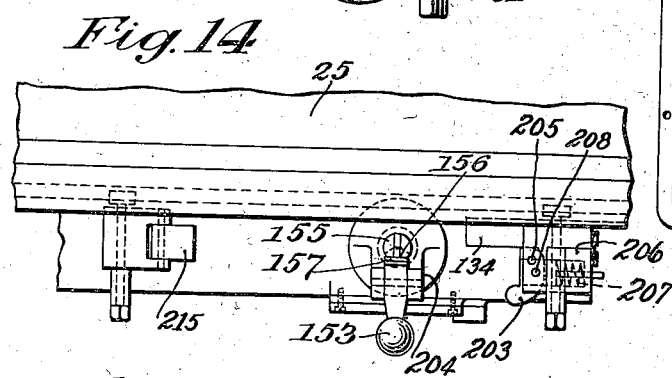
Fig. 14 shows an enlarged top plan view broken away of the edge portion of the table as seen from the near side of Fig. 1, better to illustrate the tripping dogs.

Therefore, when the handle 153 is raised the post is lowered from position shown in Figs. 8 and 15 which tends to rock the arm 158 and its shaft 127 which serves to engage the clutch 110 on shaft 107 with the sleeve 113 which engagement remains in effect until the table reaches the end of its operative stroke, whereupon the wedge-shaped trip 134 on the righthand end of the table, see Figs. 1, 14, and 15, engages a notch 160 in the post 155, see Fig. 8, drawing it up in a way to rotate the shaft 127 in the opposite direction and thereby permitting the detent 159 to shift the clutch 110 to engage the clutch face gear 106, thereby driving the shaft 107, its gear 136 and the gear 137 and the splined shaft 138 and from that through the beveled gears 139 to the feed screw 146 of the table, at a relatively high rate of speed suitable for rapid traverse. There is some lost motion between the clutch 110 and its shifter 111, so that the detent 159 will always ride over the high point of the member 158 and cause full shifting motion of the clutch.

At the same time that the wedge-shaped trip 134 raises the post 155 a dog 203 (Figs. 14 and 15) strikes the outer side of the lugs 204 on the sleeve 154 which carry the handle 153. This dog is pivoted at 205 to the adjustable support 206 on which the trip 134 is mounted, and is pressed outwardly by a spring 207 of sufficient force to overcome the force of the detent 162 which tends to hold the member 135 in neutral position. The face of the dog projects far enough to carry the sleeve 154 past this neutral position; so that the detent 201 will cause the member 135, and therefore the clutch 149 to move from engagement with one of the clutch faced gears 144, 145 into engagement with the other. If, as at the termination of the rapid non-cutting stroke of the work table, it is desired to have the feed of the table cease, the dog 203 is locked back against the pressure of its spring by a pin passing through a hole 208 in the mounting and through a corresponding hole in the dog. In this position the face of the dog projects only far enough to permit the detent 162 to hold the member 135 in neutral position.

Referring now to the speed change gearing, see Figs. 4 and 7, through which a number of changes of speed for the table may be obtained, it will be seen that the worm 104 on the shaft 54 may serve to transmit power from the said main driving shaft to all the mechanism contained within the knee and table. This is accomplished through a worm gear 163, see Fig. 4, which is secured on a short shaft 164 journaled within the knee and carries a small gear 165 that meshes with and drives a similar gear 166 mounted on a shaft 167 journaled in an adjustable cylindrical drum 168 which in turn is journaled in the knee housing. This shaft 167 carries a series of three spur gears 169, 170, and 171 of different faces and diameters and which are driven through the said worm and gear and are in engagement with a series of smaller pinions journaled in the casing of the drum. The smallest one of these spur gears, see Fig. 4, meshes with and drives a single pinion 172 journaled in the drum casing while the gear 170, which is the next in size, meshes with and drives two small pinions 173 and 174 of different diameters that are also journaled in the casing of the drum, whereas the larger one of these spur gears 171 on the shaft 167 drives three small pinions 175, 176, and 177 of different diameters which are also journaled in the casing of the drum. From this it will be seen that each of the six smaller pinions carried in the casing of the drum are driven at a different peripheral speed from the three spur gears within the drum.

The drum, together with its gears are adapted to be rotatably adjusted within the knee housing as will be clearly apparent from Figs. 1, 4, and 5 of the drawings wherein it will be seen that the outer reduced hollow shaft portion 178 of the drum is provided with a speed change dial 179 which carries two spring actuated detents 180 for engagement with sockets 181 so as to permit the drum to be rotatably adjusted in either direction to different fixed positions to insure the engagement of the respective pinions 169, 170, and 171 with the chosen one of the series of cone gears 182 on the cone gear shaft 123. As before stated, the gears carried in the casing of the drum are all of different diameters as are also the cone gears just referred to and with which they singly engage on the shaft 123. Of course additional gears mounted in the casing 168 and corresponding additional cone gears 182 may be provided to increase the range of speeds attainable with the change gear mechanism described. This range can also be increased by the change gears 121 and 122, which are moved alternatively into engagement with the gears 119 and 120, respectively, by a shifter 210 (Figs. 4 and 6) having a crank pivot 211 on a shaft 212 extending through the knee 24 and bearing a handle 213 provided with the usual spring pressed detent for holding it in either desired position.

By this means it will be apparent that many different speeds for the table may be provided and which are applicable to common practice, still in no way altering the rate of rapid traverse which is constant.

In operation the spindle 81 is started by means of the handle 200, and the handle 153 swung horizontally in the direction in which travel is desired to engage clutch 149 with one of the clutch gears 144, 145. Since the table has previously carried post 155 into contact with one of the trips 134 the clutch 110 is in engagement with gear 106 and the table starts off with its rapid traverse movement. A dog 215 is pivoted at 216 to a carrier 217 adjustably secured to the table, and as the work approaches the cutter this dog rides over the beveled top of post 155, pushing the latter down. The clutch 110 is by this means shifted into contact with the sleeve 113 and the feed of the table slows down to a speed previously determined as a correct cutting feed for the work being done. The slow feed of the table continues until the work has been passed by the cutter, whereupon the previously adjusted trip 134 (as shown, that at the left in Fig. 1) raises the post 155, shifting the clutch 110 to give rapid traverse; and simultaneously the clutch 149 is shifted completely over by contact of dog 203 with the lug 204 to reverse the direction of motion of the feed table. As clutch 110 is shifted the switch button 116 is depressed to cause stoppage of the tool spindle. The table travels back at a high rate of speed, the dog 215 pivoting over the top of the post 155 without causing any action, until the second trip 134 (that at the right in Fig. 1) is reached. The post 155 having been previously raised, this trip itself has no function; but its associated dog 203, which has been pinned back as described, moves the clutch 149 into neutral position, bringing the machine to rest for the replacement of the work piece.

Having thus described our invention, what we claim and desire to secure by Letters Patent is:

1. In a machine tool having a bed, a knee vertically movable on the bed, a saddle transversely movable on the knee, a table longitudinally movable on the saddle, and a tool mounted for operation upon work carried by the table; mechanism for moving the table in one or more directions relative to the tool comprising a main drive shaft extending from the bed into the knee, a table driving shaft extending from front to back within the knee, a rapid traverse driving member axially aligned with the table driving shaft and coupled to the main drive shaft, a sleeve surrounding the table driving shaft, variable speed gearing coupling the main drive shaft to the sleeve, a clutch intermediate the sleeve and rapid traverse driving member and movable to couple the table driving shaft either to the rapid traverse member or to the sleeve, and table shifting mechanism coupled to said table driving shaft at a point remote from said clutch and beyond the sleeve.

2. In a machine tool having a bed, a knee vertically movable on the bed, a saddle transversely movable on the knee, a table longitudinally movable on the saddle, and a tool mounted for operation upon work carried by the table; mechanism for moving the table in one or more directions relative to the tool comprising a main drive shaft extending from the bed into the knee, a table driving shaft extending from front to back within the knee, a rapid traverse driving member axially aligned with said table driving shaft and geared directly to said main drive shaft at a point within the knee, a sleeve surrounding the table driving shaft, a plurality of shafts mounted within the knee parallel to the table driving shaft, one of said parallel shafts carrying a gear coupled directly with the main drive shaft, another of said shafts carrying a gear coupled to said sleeve, variable speed gearing coupling said parallel shafts, a clutch intermediate the sleeve and rapid traverse driving member and movable to couple the table driving shaft either to the rapid traverse driving member or to said sleeve, and table shifting mechanism coupled to the table driving shaft at a point remote from the clutch and beyond the sleeve.

3. In a machine tool having a bed, a knee vertically movable on the bed, a saddle transversely movable on the knee, a table longitudinally movable on the saddle, and a tool mounted for operation on work carried by the table; a main drive shaft extending from the bed into the knee, three parallel shafts extending from front to back within the knee and laterally separated from each other, said shafts comprising a table driving shaft, a feed shaft, and an intermediate shaft, a rapid traverse driving member aligned with said table driving shaft and coupled to the main drive shaft, a sleeve surrounding said table driving shaft, gearing connecting the main drive shaft with the feed shaft, variable gearing coupling the feed shaft to the intermediate shaft, variable speed gearing coupling the intermediate shaft to the sleeve, a clutch intermediate the sleeve and rapid traverse driving member and movable to couple the table driving shaft either to the rapid traverse member or to the sleeve, and table shifting mechanism coupled to said table driving shaft at a point remote from said clutch and beyond the sleeve.

4. In a machine tool having a bed, a knee vertically movable on the bed, a saddle transversely movable on the knee, a table longitudinally movable on the saddle, and a tool mounted for operation on work carried by the table; a vertical main drive shaft connected to the bed and extending upwardly into the knee near the rear of the latter, a bevel gear coupled to said vertical shaft, a second bevel gear meshing with the first and having its axis horizontal and extending toward the front of the knee, a rapid traverse clutch coupled in axial alignment to said second bevel gear so as to rotate therewith, a table driving shaft extending from the front of the knee rearwardly in alignment with said rapid traverse clutch and in adjacency thereto, a sleeve surrounding the table driving shaft, variable speed gearing coupling the main drive shaft with said sleeve, a clutch sleeve mounted on the table driving shaft between the rapid traverse clutch and the sleeve for alternative engagement therewith, and table shifting mechanism coupled to the table driving shaft at a point remote from said clutch and beyond the sleeve.

5. In a machine tool having a bed, a knee vertically movable on the bed, a saddle transversely movable on the knee, a table longitudinally movable on the saddle, and a tool mounted for operation on work carried by the table; a vertical main drive shaft telescopically connecting the bed and the interior of the knee near the rear of the latter, a bevel gear coupled to said vertical shaft, a second bevel gear meshing with the first and having its axis horizontal and extending toward the front of the knee, a rapid traverse clutch coupled in axial alignment to said second bevel gear so as to rotate therewith, a table driving shaft extending from the front of the knee rearwardly in axial alignment with said rapid traverse clutch and in adjacency thereto, a sleeve surrounding the table driving shaft, variable speed gearing coupling the main drive shaft with said sleeve, a clutch member splined to the table driving shaft between the rapid traverse clutch and the sleeve for alternative engagement therewith, and table shifting mechanism coupled to the table driving shaft at a point remote from said clutch and beyond the sleeve, said variable speed driving means comprising a feed shaft spaced from and parallel to the table driving shaft and an intermediate shaft between them, gearing connecting the feed shaft with said main drive shaft, variable speed gearing connecting the feed shaft with the intermediate shaft, a plurality of gears fixed to the sleeve, and a plurality of gears slidable on the intermediate shaft and engageable alternatively with said sleeve carried gears.

6. In a machine tool having a bed, a knee verically movable on the bed, a saddle transversely movable on the knee, a table longitudinally movable on the saddle, and a tool mounted for operation on work carried by the table; a main drive shaft connecting the bed and the interior of the knee, a rapid traverse clutch journaled in the knee and connected to said drive shaft, a table driving shaft journaled in the knee and extending from the front thereof in alignment with and in adjacency to the rapid traverse driving member, a sleeve surrounding the table driving shaft, variable speed gearing carried in the knee and connecting the main drive shaft with said sleeve, adjusting mechanism for said variable speed gearing carried by the knee, a clutch for connecting the rapid traverse clutch member or said sleeve to the table driving shaft, and mechanism mounted on the table for controlling said clutch.

7. In a machine tool having a bed, a knee vertically movable on the bed, a saddle transversely movable on the knee, a table longitudinally movable on the saddle, and a tool mounted for operation on work carried by the table; a main drive shaft connecting the bed and the interior of the knee, a table driving shaft running from front to rear in the knee, a table driving gear mounted on the front end of said shaft, a splined shaft running from front to back and passing externally of the knee, a gear on the spline shaft directly meshing with the table driving gear, gearing carried by the saddle and splined to said spline shaft, gearing connecting the saddle-carried gearing with the table to cause reciprocation thereof, a feed shaft running from front to back within the knee and geared to the main drive shaft, an intermediate shaft between the feed shaft and the table driving shaft, variable speed gearing between the feed shaft and the intermediate shaft and between the intermediate shaft and the table driving shaft, and control means carried by the knee for adjusting said gearing.

8. In a machine tool having a bed, a knee vertically movable on the bed, a saddle transversely movable on the knee, a table longitudinally movable on the saddle, and a tool mounted for operation on work carried by the table; a main drive shaft extending from the bed into the knee, a table driving shaft extending from front to back within the knee, a rapid traverse driving member axially aligned with said table driving shaft and coupled to the main drive shaft, a sleeve surrounding the table driving shaft, variable speed gearing coupling the main drive shaft to the sleeve, a clutch movable to couple the table driving shaft either to the rapid traverse member or to the sleeve, a gear mounted on the front end of the table driving shaft, a splined shaft running from front to back of the knee, gearing connecting said splined shaft with the gear on the front end of the table driving shaft, and mechanism including a gear carried by the saddle and splined on the splined shaft for transmitting table driving movement to the table.

NEWMAN M. MARSILIUS.
ROBERT WM. OTT.